June 13, 1967    G. R. ASCHAUER    3,324,981
COMBINED CONE AND PLATE TYPE CLUTCH MECHANISM
Filed June 9, 1965    2 Sheets-Sheet 1

INVENTOR.
GEORGE R. ASCHAUER
BY
James E. Nilles
ATTORNEY

INVENTOR.
GEORGE R. ASCHAUER

United States Patent Office 3,324,981
Patented June 13, 1967

3,324,981
COMBINED CONE AND PLATE TYPE CLUTCH
MECHANISM
George R. Aschauer, Racine, Wis., assignor to Twin Disc
Clutch Company, Racine, Wis., a corporation of Wisconsin
Filed June 9, 1965, Ser. No. 462,504
20 Claims. (Cl. 192—48)

The present invention relates to a combination cone and friction plate type clutch.

A conventional clutch of the multiple plate type is advantageous over other types in that it has the ability to rapidly dissipate heat by its multiple surfaces. The plate type clutch, on the other hand, has certain disadvantages or shortcomings such as "flutter failure" which is caused by wobble of the plates and reciprocating axial motion thereo; if this flutter becomes sufficiently violent or rapid the plates will eventually destroy themselves. Another disadvantage, and a dangerous one, is that of "neutral drag" wherein a certain drag torque is present event if the clutch is released or disengaged.

A conventional cone-type clutch has the advantages of complete and quick disengagement, large mechanical advantage due of wedging action of the cone and exceptional force transmitting or "carrying" ability. On the other hand, however, cone clutches cannot accept or handle large quantities of heat because of their relatively small area, and they tend to expand when hot and go into a locking condition, and therefore are not suitable for operating hot.

I have observed that a multiple plate clutch which never releases but instead is continuously and resiliently engaged, does not have a sudden transition or torque variation or friction coeffiicent build up; that is to say, there appears to be not peak on a shock load curve.

The present invention provides a combined cone type clutch and a friction plate type clutch which are arranged in a novel manner; the arrangement is such that the friction plates are continuously and resiliently engaged and the cone clutch is located radially outward of the plate clutch and in axial alignment with it. In other words the friction plates are nested directly radially within the cone clutch and they do not release, and a highly compact effective and efficient clutch is provided.

With the clutch provided by the present invention, flutter failure and neutral drag have been eliminated because it is possible to keep the friction plates of the present clutch in constant engagement; at the same time the clutch can handle large quantities of heat, and has no sudden transition or torque variation or friction coefficient build up. That is, there are no peaks on a shock load curve of the clutch.

Generally, the present invention provides a combined friction plate and cone clutch having quick engagement and release due to a short engaging stroke of the cone clutch, clean release and low drag torque when running released, high energy capacity, low inertia advantages and a substantial reduction in engaging peak torque.

These and other objects and advantages of the present invention will appear as this disclosure progresses, reference being had to the accompanying drawings, in which.

Figure 1:
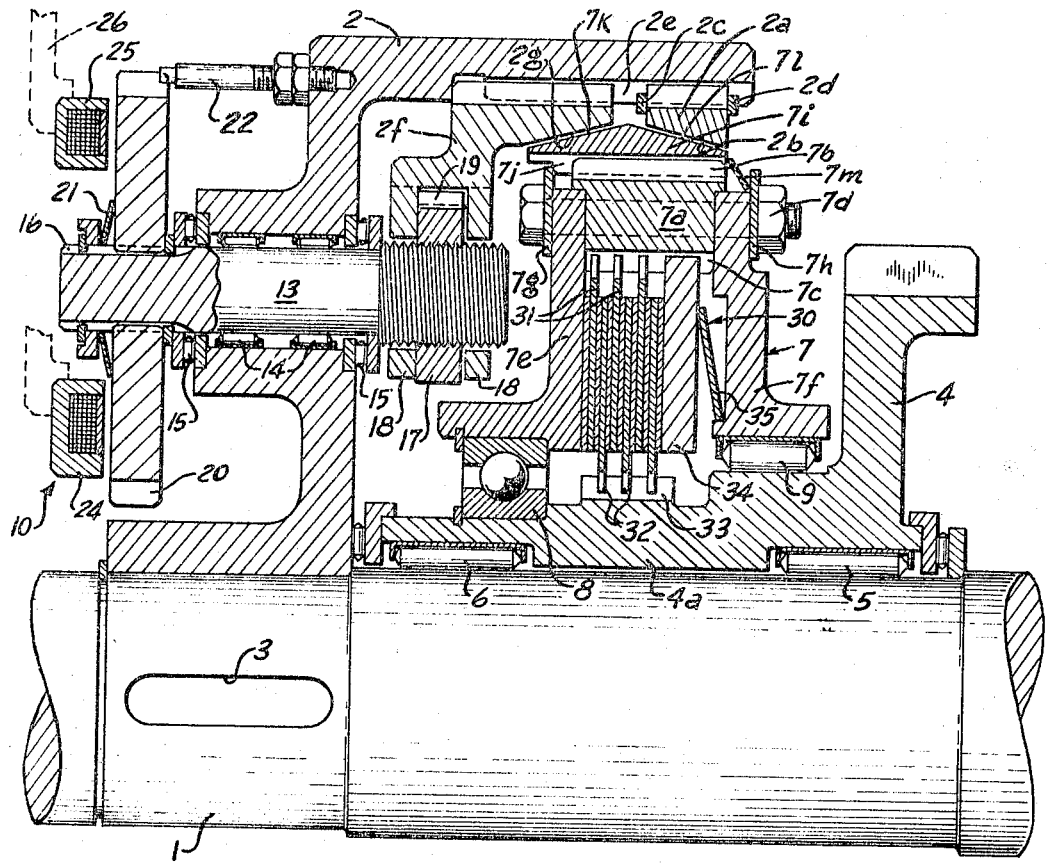
FIGURE 1 is a fragmentary longitudinal cross sectional view of a clutch embodying the present invention.
Figure 2:
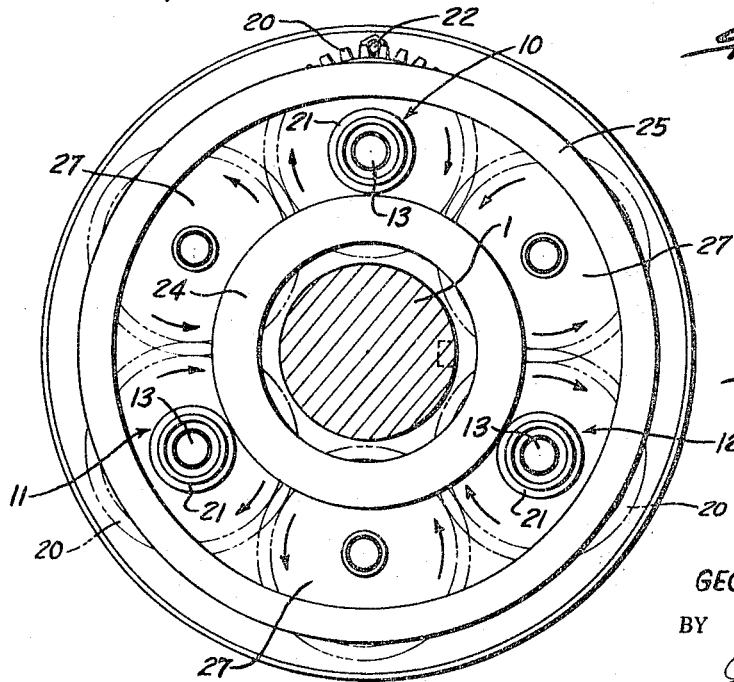
FIGURE 2 is an end elevational view of the device of FIGURE 1.

The embodiment of the invention shown in FIGURE 1 includes a power input member in the form of shaft 1 and the cup 2 fixed thereon by key means 3, an output member in the form of a gear 4 having a long hub 4a and which is rotated by and concentrically mounted on shaft 1 by anti-friction needle bearing assemblies 5 and 6 which surround the shaft. An intermediate member 7 is journalled by anti-friction bearing assemblies 8 and 9 and this member includes a central portion 7a having external splines 7b around its periphery and internal clutch plate splines 7c. Bolt means 7d pass through the end members 7e and 7f and also through the central portion 7a, and thus hold the intermediate assembly together. Washers 7g and 7h limit the axial sliding or floating movement of a cone element 7i which has internal splines 7j that drivingly mesh with the external splines on central portion 7a. Thus the intermediate member 7 includes a floating clutch element 7i which has two oppositely tapered clutch surfaces 7k and 7l and which element can shift slightly axially within the limits defined by the washers. A Belleville spring 7m urges the cone element to the left (as viewed in FIGURE 1) or clutch release position.

The other portions which form part of the cone clutch are carried by the drive cup 2 and include an axially fixed member 2a having an inclined surface 2b that complements and is engaged by surface 7l of the cone element. Member 2a is fixed by snap rings 2c and 2d and has a spline connection with the internal splines 2e of the cup for being driven therewith. The cup also carries a cone clutch actuating element 2f which has a spline connection with the cup for axial sliding movement from a clutch engaged position in which its inclined surface 2g engages surface 7k of the cone and forces the cone to the right (as viewed in FIGURE 1) and against the fixed member 2a.

The slidable cone clutch element having two oppositely tapered surfaces can shift axially within limits and is engaged by the fixed member 2a and the actuating element 2f, which results in equalized torque transmitting loads on each of its tapered surfaces.

The clutch actuating element 2f is in the form of a ring which surrounds shaft 1 and is shifted axially on its spline connection to the input member by three circumferentially spaced adjusting means 10, 11 and 12. One of these adjusting means has been shown and will be described in detail, recognizing that all three are similar and work together to cause smooth and accurate actuation of the element 2f.

The adjusting means 10 includes a shaft 13 rotatably mounted by needle bearing assemblies 14 in the cup 2. Axial thrust bearing assemblies 15 absorb end thrust of the shaft and hold it axially captive in the cup. The inner end of shaft 13 is threaded and a nut 17 runs in threaded engagement on it. The nut is embraced by the bifurcated portion 18 of the ring like element 2f and is prevented from rotating by the stop 19 carried by the element. Thus, rotation of shafts 13 causes element 2f to move axially in the clutch engaging or disengaging direction.

Rotationally fixed to the other end of shaft 13 is a gear 20 by means of the spline connection 16 which permits limited axial movement of the gear on the shaft. A Belleville spring 21 urges the gear to the right and into engagement with the lock pin 22 which protrudes from the cup.

A pair of concentrically arranged, electric coils 24 and 25 are fixed in a frame 26 adjacent the gear and energization of the coils in the known manner draws the gear towards them and out of engagement with the lock pin 22. When one coil is energized, coil 24 for example, the gears 20 rotate in one direction to cause clutch clamp up, and when the other coil 25 is energized, the shaft 13 is caused to rotate in the opposite direction to withdraw element 2f from engagement with the cone element.

The three gears 20 are interconnected or synchronized by the three intermediate idler gear 27 with which they are in constant mesh.

The above described screw thread adjustment provides high clamp and torque which adds to and supplements the mechanical wedging advantage of the cone clutch. The high speed action of the coils and threads is smooth in operation and gives quick actuation because of its short stroke.

The intermediate member 7 is connected to the output member by a constantly and resiliently engaged friction multiple plate clutch 30. This plate clutch includes the plates 31 which are conventionally splined to the internal spline 7c, and the plates 32 conventionally splined at 33 to output member 4. A back plate 34 urges the interleaved plates 31 and 32 to the clamp-up or engaged position due to the action of the Belleville spring 35.

Thus, the plate clutch is constantly and resiliently urged to the engaged position and is radially nested within and axially aligned with the cone clutch.

Figure 3:
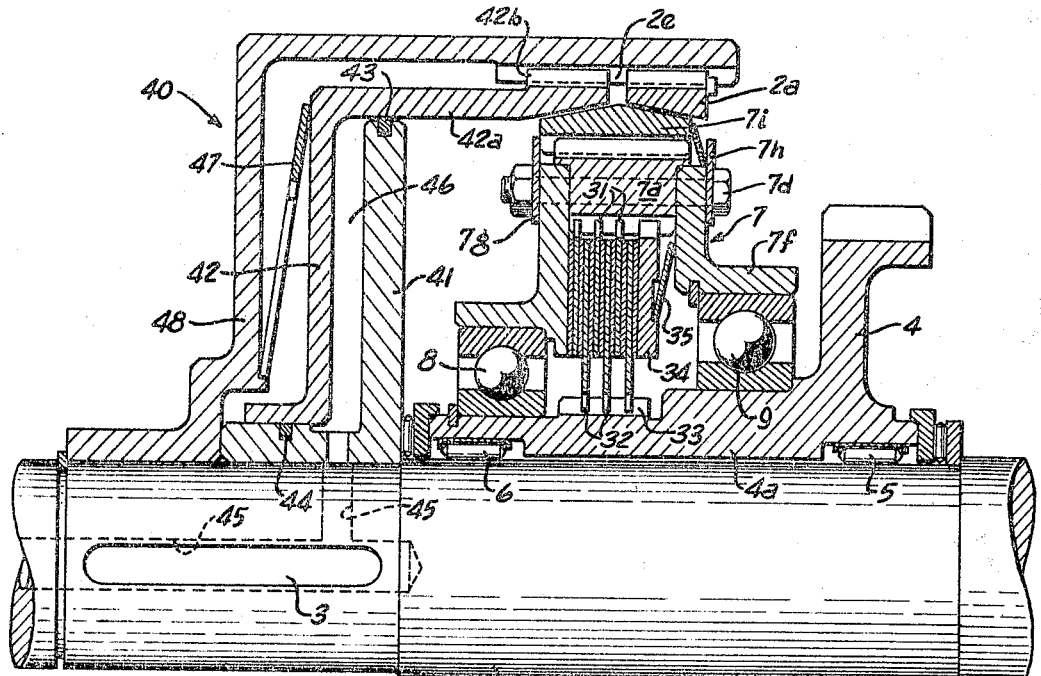
FIGURE 3 is a view similar to FIGURE 1 but showing a modified form of the invention.

In FIGURE 3 a modification of the invention has been shown and similar parts to the FIGURE 1 device have been correspondingly identified.

In FIGURE 3 device, the actuating means for the cone clutch has been shown as a single acting cylinder and piston means 40, including an axially fixed reaction or piston member 41 and the axially slidable cylinder 42. Conventional fluid seals 43 and 44 are provided between the cylinder and piston and a fluid passageway 45 is in fluid communication with the clutch disengaging chamber 46 and with a source of conventional pressure fluid (not shown). The cylinder 42 has a long cylindrical wall 42a having external splines 42b which engage the internal splines 2e. Thus, the cylinder includes the cone clutch actuating element.

A large Belleville spring 47 acts between the cup 48 and the cylinder 42 to urge the latter into cone clutch engaged position.

In the FIGURE 3 embodiment therefore, the clutch is disengaged by the hydraulic cylinder and piston means.

Figure 4:
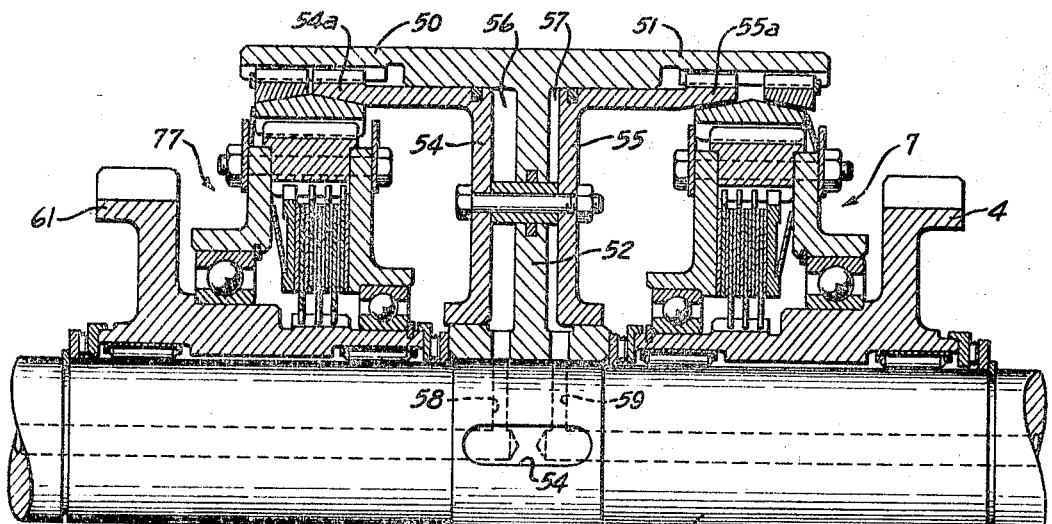
FIGURE 4 is a fragmentary, longitudinal view of another modified form of the invention as applied to a double clutch.

The invention has been shown in FIGURE 4 as applied to a double clutch device, each clutch of which is similar to the FIGURE 3 device except the cone clutch is both engaged and disengaged by the hydraulic cylinder and piston means. Similar parts have been correspondingly identified and their operation and function need not again be described except to say that the drive cups 50 and 51 are formed as an integral unit having a common, central reaction portion 52 that is fixed to the drive shaft 53 by key means 54. Two shiftable cylinders 54 and 55 define the expansible actuating chambers 56 and 57, respectively, with cups 50 and 51 and the central portion 52. Here too, the cone clutch actuating elements 54a and 55a are formed by a portion of the cylinder and piston means.

When chamber 56 is pressurized by fluid entering via passage 58, chamber 57 exhausts via passage 59, and vice-versa.

Output gear members 4 and 61 are provided for their respective clutches 7 and 77 and are suitably journalled for rotation on shaft 53.

Summary

The clutch mechanism provided by the present invention is particularly compact in axial and radial directions and efficient in operation. The friction plates do not disengage and there is no flutter failure problems. The present clutch also avoids sudden torque variation, shock loads or neutral drag. At the same time the mechanism can handle large quantities of heat, has good mechanical advantages and has complete and rapid disengagement.

The floating cone element 7i and the actuating elements 2f, 42a, 54a and 55a have been described as having a spline connection with their associated part, and this term, of course, would include any connection which permits axial relative sliding movement but fixes the members for rotation together as a unit.

The friction plates have been described as being resiliently engaged and spring means have been shown for this purpose. It should be realized that other means may be employed for this purpose, such as for example, a hydraulically operated cylinder and piston means.

Various modes of carrying out the invention are contemplated as being within the scope of the following claims particularly pointing out and distinctly claiming the subject matter which is regarded as the invention.

I claim:

1. Clutch mechanism comprising, a power input member and a power output member co-axially arranged therewith, an intermediate member rotatably mounted on said output member, a disengageable cone clutch between said input and intermediate members and forming a disengageable drive connection therebetween, a friction multiple plate clutch between said intermediate and output members, resilient means for constantly urging said plate clutch to the engaged position, said plate clutch being nested radially within and in axial alignment with said cone clutch, and means for actuating said cone clutch.

2. Mechanism as defined in claim 1 further characterized in that said cone clutch includes an actuating element which has an inclined surface and is mounted for axial sliding movement for causing engagement and disengagement of said cone clutch.

3. Mechanism as defined in claim 2 further characterized in that said actuating element has a spline connection to said input member for axial shifting to cause actuation of said cone clutch.

4. Mechanism as defined in claim 2 including a "floating" clutch element having two oppositely tapered surfaces, one of which is engaged by said actuating element, said clutch element adapted to shift axially within predetermined limits for causing equalized torque transmitting load on each of its tapered surfaces.

5. Mechanism as defined in claim 2 further characterized in that said floating clutch element has a spline connection with said intermediate member.

6. Mechanism as defined in claim 2 further characterized in that said means for actuating said cone clutch is connected to said actuating element for axial shifting thereof.

7. Clutch mechanism comprising, a power input member and power output member co-axially arranged therewith, an intermediate member rotatably mounted on said output member, a disengageable cone clutch between said input and intermediate members and forming a disengageable drive connection therebetween; said cone clutch including an axially shiftable actuating element having an inclined surface and a spline connection to said input member for engagement and disengagement of said cone clutch, said cone clutch also including a floating clutch element having two oppositely tapered surfaces, one of which is engaged by said actuating element, said clutch element having a spline connection with said intermediate member and adapted to shift axially thereon within predetermined limits for causing equalized torque transmitting load on each of its tapered surfaces; a friction multiple plate clutch between said intermediate and output members, resilient means for constantly urging said plate clutch to the engaged position, said plate clutch being nested radially within and in axial alignment with said cone clutch, and means for actuating said cone clutch and connected to said actuating element for axial shifting thereof.

8. Mechanism as defined in claim 7 further characterized in that said means for actuating said cone clutch includes, a rotatable adjusting member having a threaded connection with said cone clutch, and electric coil means to cause rotation of said adjusting member and consequent actuation of said cone clutch through said threaded connection.

9. Clutch mechanism comprising, a power input member and a power output member co-axially arranged therewith, an intermediate member rotatably mounted on said output member, a disengageable cone clutch between said input and intermediate members and forming a disengageable drive connection therebetween, said cone clutch having an actuating element including an inclined surface and mounted for axial sliding movement, a friction multiple plate clutch between said intermediate and output members, means for constantly and resiliently urging said plate clutch into the engaged position, said plate clutch being nested radially within and in axial alignment with said cone clutch, a rotatable adjusting means having a threaded connection with said actuating element whereby rotation of said means causes axial shifting of said actuating element resulting in cone clutch actuation, and electric coil means for causing rotation of said adjusting means.

10. Mechanism as defined in claim 9 further characterized in that said actuating element has a spline connection to said input member for axial shifting to cause actuation of said cone clutch.

11. Mechanism as defined in claim 9 including a "floating" clutch element having two oppositely tapered surfaces, one of which is engaged by said actuating element, said clutch element adapted to shift axially within predetermined limits for causing equalized torque transmitting load on each of its tapered surfaces.

12. Mechanism as defined in claim 9 further characterized in that said floating clutch element has a spline connection with said intermediate member.

13. Clutch mechanism comprising, a power input member and a power output member co-axially arranged therewith, an intermediate member rotatably mounted on said output member, a disengageable cone clutch between said input and intermediate members and forming disengageable drive connection therebetween, said cone clutch having an actuating element including an inclined surface and mounted for axial sliding movement, a friction multiple plate clutch between said intermediate and output members, means for constantly and resiliently urging said plate clutch into the engaged position, said plate clutch being nested radially within and in axial alignment with said cone clutch, a hydraulically operated cylinder and piston means for actuating said cone clutch, said actuating element forming a portion of said cylinder and piston means.

14. Mechanism as defined in claim 13 further characterized in that said cylinder and piston means is of the single acting type and is arranged to cause cone clutch disengagement, and resilient means for biasing said actuating element to a cone clutch engaged position.

15. Mechanism as defined in claim 13 further characterized in that said actuating element has a spline connection to said input member for axial shifting to cause actuation of said cone clutch.

16. Mechanism as defined in claim 13 including a "floating" clutch element having two oppositely tapered surfaces, one of which is engaged by said actuating element, said clutch element adapted to shift axially within predetermined limits for causing equalized torque transmitting load on each of its tapered surfaces.

17. Mechanism as defined in claim 13 further characterized in that said floating clutch element has a spline connection with said intermediate member.

18. Clutch mechanism comprising, a power input member and a power output member co-axially arranged therewith, an intermediate member rotatably mounted on said output member, a disengageable cone clutch between said input and intermediate members and forming a disengageable drive connection therebetween, a friction multiple plate clutch between said intermediate and output members, said intermediate members comprising spaced apart end members each mounted on a bearing, said plate clutch being located axially between said end members, said plate clutch being nested radially within and in axial alignment with said cone clutch, and means for controlling actuation of said cone clutch.

19. Mechanism as defined in claim 18 further characterized in that said cone clutch includes an actuating element which has an inclined surface and is mounted for axial sliding movement on said input member for causing engagement and disengagement of said cone clutch.

20. Mechanism as defined in claim 19 wherein said cone clutch element has two oppositely tapered surfaces, one of which is engaged by said actuating element.

References Cited

UNITED STATES PATENTS

| | | | |
|---|---|---|---|
| 2,842,004 | 7/1958 | Lammerz et al. | 192—48 |
| 2,953,034 | 9/1960 | Weaver | 192—48 |
| 3,098,550 | 7/1963 | Schwab | 192—48 |
| 3,251,442 | 5/1966 | Aschauer | 192—48 |

FRED C. MATTERN, Jr., *Primary Examiner.*

C. J. HUSAR, *Assistant Examiner.*